Jan. 16, 1962 J. C. MILLER 3,017,613

NEGATIVE RESISTANCE DIODE MEMORY

Filed Aug. 31, 1959 2 Sheets-Sheet 1

INVENTOR.
JAMES C. MILLER
BY John V. Regan
ATTORNEY

INVENTOR.
JAMES C. MILLER
BY John V. Regan
ATTORNEY

United States Patent Office 3,017,613

Patented Jan. 16, 1962

3,017,613

NEGATIVE RESISTANCE DIODE MEMORY

James C. Miller, Hamilton Square, N.J., assignor to Radio Corporation of America, a corporation of Delaware Filed Aug. 31, 1959, Ser. No. 837,182
6 Claims. (Cl. 340—173)

The present invention relates to improved circuits employing "negative resistance" diodes. While not restricted thereto, the invention is especially useful in high speed memories for computers.

The circuit of the present invention includes a negative resistance diode having two regions in its operating range exhibiting positive resistance, and a region between these positive resistance regions exhibiting negative resistance. The two positive resistance regions correspond to two stable states of the diode one in a lower voltage range and the other in a higher voltage range. In memory circuit applications, one of the stable states may represent a stored binary digit of one type, say binary zero, and the other a binary digit of the type, binary one.

It has been discovered that when the diode is switched from its high voltage state to its low voltage state by applying a reverse-bias, direct-current, read pulse to the diode, a relatively high value of voltage remains across the diode for an interval after the read pulse has disappeared. This phenomenon is made use of here to determine the diode state. The direct voltage across the diode is sensed immediately after the end of a reverse-bias, read pulse applied to the diode. The presence of a relatively high voltage indicates that the diode has been switched in response to the read pulse and its absence that the diode has not been switched. Thus, in memory applications, when a high voltage is sensed across the diode during the period immediately following the read pulse, the stored digit is of one type, say binary one, and when the voltage sensed across the diode during this period is low, the stored digit is of another type, binary zero. Since the sensing interval occurs after the application of the read pulse, the latter does not introduce extraneous noise and the signal-to-noise ratio of the read-out is high.

The invention will be described in greater detail by reference to the following description taken in connection with the accompanying drawing in which:

FIG. 1 is a curve to explain the operation of the circuit of the present invention;

FIG. 1*a* is a simplified diagram of a circuit from which the curve of FIG. 1 may be derived;

FIG. 3 is a curve of waveforms to aid in explaining the operation of the circuit of FIG. 2.

Figures 1, 1A, 2:
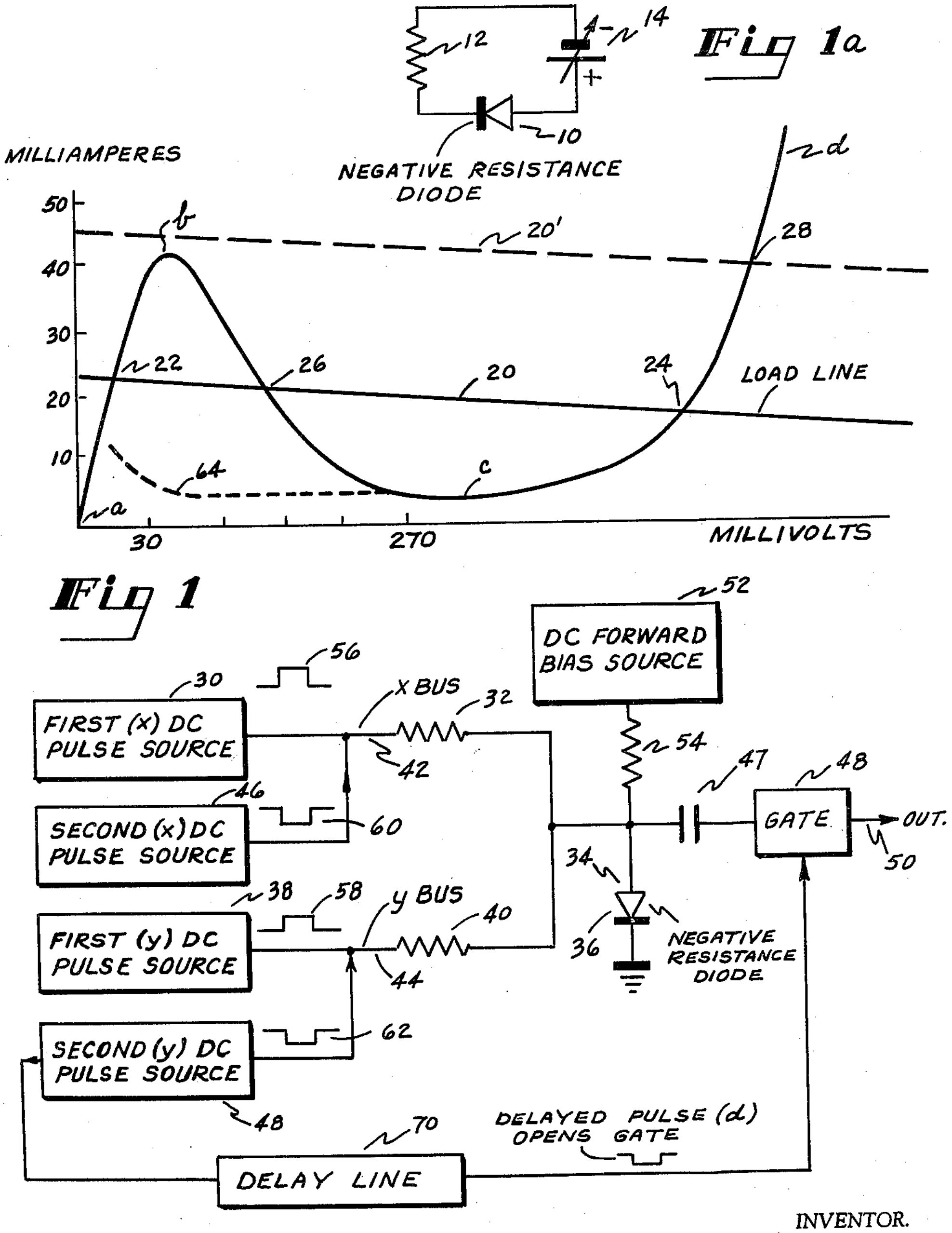
FIG. 2 is a block and schematic circuit diagram of one form of the present invention.

A voltage-current characteristic of a known negative resistance diode is shown by the curve *a, b, c, d* in FIG. 1. The values of millivolts and milliamperes given are typical but are not meant to be limiting. The milliampere range, for example, may differ substantially for different diodes.

The portions *ab* and *cd* of the volt-ampere (E–I) characteristic are regions of positive resistance ($dE/dI$, the inverse of the slope, which is equal to incremental resistance R, is a positive quantity in this region). The portion *bc* of the volt-ampere characteristic is a region of negative resistance.

A circuit for the diode may include, in series, the diode 10, a load resistor 12 (which may be assumed to include the internal resistance of the source) having a resistance at least ten times that of the diode, and a source of voltage 14 having, by way of example, a value of 3 volts or so. The diode resistance may be a few ohms or more and the load resistance up to several hundred ohms. The source and load resistor together act like a constant-current source and load line 20 has the slope indicated. If the source were a perfect constant current source, load line 20 would be parallel to the millivolt axis.

Load line 20 intersects the positive resistance region *ab* of the characteristic at 22 and the positive resistance region *cd* of the characteristic at 24. It also intersects the negative resistance region *bc* of the diode at 26. The latter intersection is an unstable operating point.

Assume that initially the voltage across the diode is of the order of 25 millivolts or so. The current through the diode is about 23 milliamperes and the diode is at a stable low voltage state represented by the point 22. If the forward-bias current through the diode is increased, the load line is raised on the characteristic until the load line passes through point *b*. The point *b* represents a current of about 43 milliamperes. It is believed that increasing the current to a value greater than this raises the load line beyond *b* as indicated by dashed load line 20. This load line does not intersect region *ab* so that the diode cannot continue to operate there. It is believed that the diode then "attempts" to operate in the negative resistance region *bc* but that this is not possible as this region represents an unstable state of the diode. The third alternative is for the diode to switch through the negative resistance region *bc* to the intersection of the raised load line and the positive resistance region *cd*.

In operation, it is observed that when the diode current is increased in the manner described above, the diode voltage does switch from about 50 millivolts to a value represented by the intersection 28 of raised load line 20' and curve portion *cd* (about 400 millivolts). Subsequent reduction of the current to the value indicated by load line 20 reduces the voltage to a lower value as indicated by point 24. The point 24 or some other point of load line intersection representing a stable operating condition on the positive slope region *cd* of the characteristic is hereafter termed the high voltage state of the diode and the point 22 or some other point of load line intersection representing a stable operating condition on the positive portion *ab* of the characteristic is hereafter termed the low voltage state of the diode.

In a practical circuit, the diode may be switched from one stable state to another by very short current pulses, as short as 0.1–2 millimicroseconds in duration, for example. A forward-bias current pulse can switch the diode from its low to its high state and a reverse-bias current pulse can switch the diode from its high to its low state. The voltages across the diode in its high and low states may be arbitrarily assumed to represent the binary digits one and zero respectively.

Further general discussion of negative resistance diodes and their characteristics may be found in an article by H. S. Sommers, Jr. appearing in the Proceedings of the IRE, July 1959, page 1201.

FIG. 2 illustrates one embodiment of the present invention. Direct-current pulse sources 30 and 46 are connected via lead 42 and resistor 32 to the anode 34 of a negative resistance diode 36. Direct-current pulse sources 38 and 48 are connected via lead 44 and resistor 40 also to anode 34. The sources have sufficiently high internal impedances effectively to be isolated from one another. The source 30 (designated the first *x* pulse source) and source 38 (designated the first *y* pulse source) both supply forward-bias current pulses 56, 58, and source 46 (designated the second *x* pulse source) and source 48 (designated the second *y* pulse source) both supply reverse-bias pulses 60 and 62. The *x* pulse sources 30 and 38 provide pulses of sufficient amplitude, taken together additively, to drive the diode into its high voltage state from its low voltage state; and the *y* pulse sources 46 and 48 provide pulses of sufficient amplitude, taken together, to drive the diode into its low voltage state. Lead 42 carries so-called *x* information and is termed an *x* bus and lead 44 carries so-called *y* information and is termed a *y* bus.

Anode 34 is connected through a coupling capacitor 47 to a normally closed gate circuit 48. (The coupling element can be a resistor instead.) The output of the gate circuit is available at lead 50. Quiescent bias current for the diode is applied from a D.C. source 52 through a resistor 54 to anode 34.

The circuit of FIG. 2 operates as follows. The direct-current source 52 forward-biases the diode as indicated by load line 20 in FIG. 1. It may be assumed that the diode is in its low voltage state so that the current through and the voltage across the diode may be represented by point 22 on the curve. When it is desired to write the binary digit one, first *x* pulse source 30 and first *y* pulse source 38 apply forward-bias, direct-current pulses 56 and 58 to the diode. Their amplitudes are such that one pulse is insufficient to drive load line 20 past point *b* on the curve, but two pulses received coincidentally are sufficient to do so. Accordingly, coincidentally applied first pulses 56 and 58 switch the diode from its low voltage state 22 to its high voltage state 24 (FIG. 1). In the same manner, the diode may be switched from its high voltage state 24 back to its low voltage state 22 by simultaneously applying reverse-bias pulses from second *x* and *y* sources 46 and 48.

Read-out may be accomplished by second *x* and *y* pulse sources 46 and 48 and associated elements. These sources apply direct-current, reverse-bias pulses to the diode having jointly an amplitude sufficient to move the load line 20 from point 24 to a point beyond *c*. It has been found that when the diode is in its high state and two read-out pulses 60 and 62 (FIG. 2) are simultaneously applied, the voltage across the diode is as shown in FIG. 3*b*. It may be observed that this signal has a duration substantially longer than the read-out pulses. The length of the "tail" on the pulse will depend upon the particular diode used but signals having more than twice the duration of the read-out pulses have been observed.

It is believed that the presence of this relatively long duration pulse may be explained as follows. It is thought that the transmission from point 24 to point *c* (FIG. 1) is very rapid. It is also believed that the transition from point *c* into the negative resistance region is very rapid. Exactly what occurs in the negative resistance region is not fully understood.

It is believed that the charge stored on the distributed shunt capacitance of the diode (about 100–200 micro-microfarads) discharges through the external impedance of the driving circuit rather than through the diode resistance and that the time constant of this discharge circuit is sufficiently high to produce the tail. The steeper sloping portion of the tail from point 64 to point 22 (FIG. 3*b*) is believed to be due to the diode entering the positive resistance region of the low voltage state. Note that during the tail interval, the voltage across the diode is substantially higher than that characteristic of the low voltage state of the diode.

If the diode is initially in its low voltage state and is interrogated by coincident reverse-bias pulses as shown in FIG. 3*a*, the voltage across the diode will be as shown in FIG. 3*c*. The diode is not driven into its negative resistance region but instead is driven down the positive resistance portion *ab* of the curve. Upon the termination of the pulse of FIG. 3*a*, the diode voltage returns to its original value of about 20 millivolts (FIG. 3*c*).

From the foregoing, it can be seen that the presence or absence of a tail on the voltage pulse across the negative resistance diode 36 is indicative of whether the diode was switched from its high state to its low state or was originally in its low state and remained there.

A circuit for sensing the tail is also shown in FIG. 2.

It includes the delay line 70 which delays the *y* direct-current pulse 62 for an interval equal to or slightly greater than the pulse interval. The delayed pulse is applied to normally closed gate 48 to open the gate. The gate, for example, may be a tube or transistor amplifier which is normally biased to an "off" or non-conducting state by a suitable voltage. The delayed pulse as shown in FIG. 3*d* is of the correct polarity and magnitude to overcome the bias and restore the amplifier to an active state. If a tail voltage is present at the amplifier input, it will now be amplified and a relatively large output will occur. The absence of a tail input results in little or no output and hence can be readily distinguished.

If, during the interval that the gate is open, a relatively large voltage pulse appears at lead 50, it is indicative of the binary digit one stored in diode 36 and if a relatively large voltage does not appear, it is indicative of the binary digit zero stored in diode 36.

Figures 4, 7:
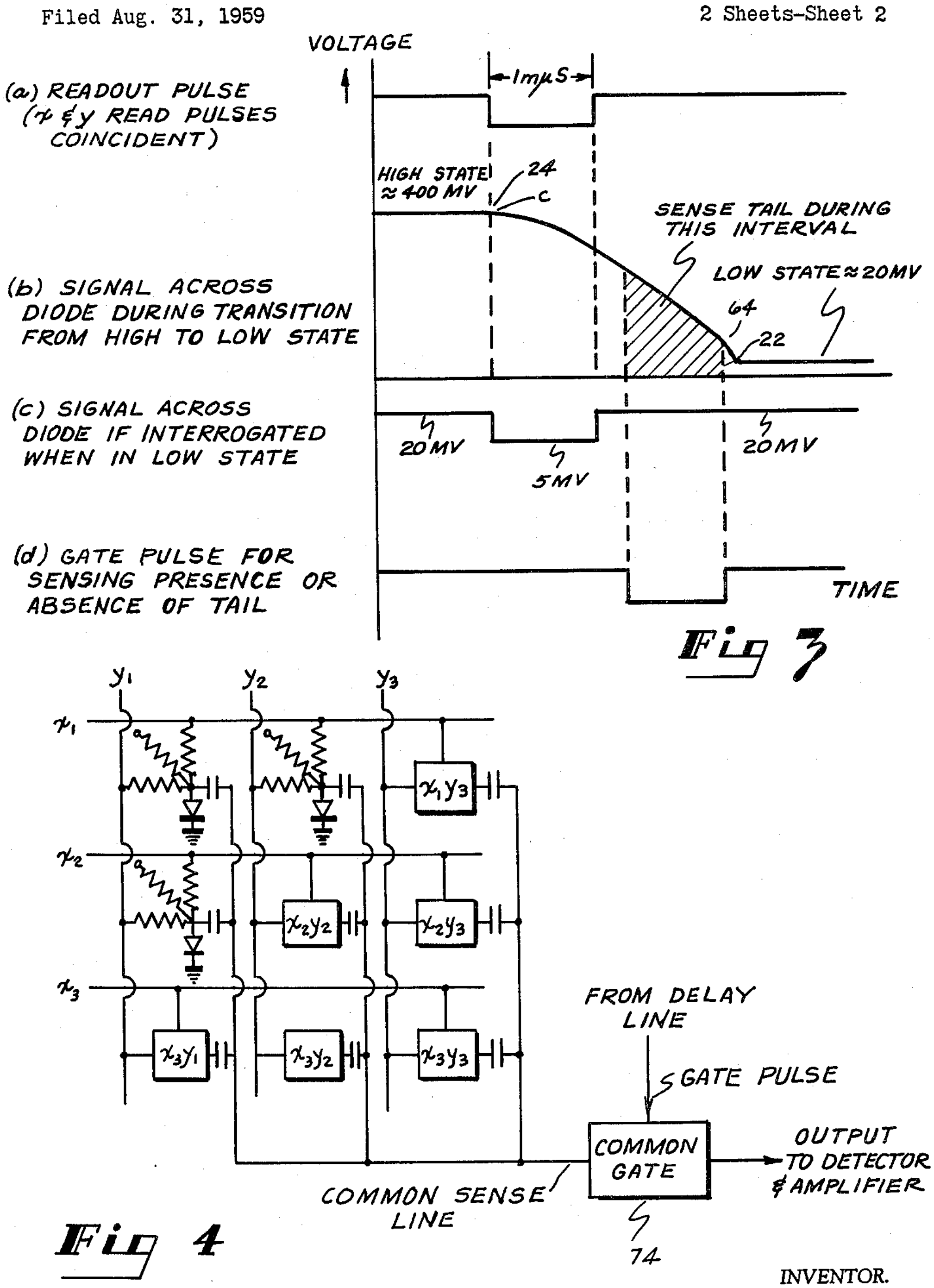
FIG. 4 is a block and schematic circuit diagram of a memory matrix according to the present invention.

A memory matrix or memory plane is illustrated in FIG. 4. Only three *x* buses and three *y* buses are shown. It will be appreciated that there may be many more of each and that there may be many than nine memory elements. The *x* read and write sources (not shown) may be of the type illustrated in FIG. 2. For example, a selected *x* bus, say $x_1$, may correspond to bus 42 of FIG. 2 and a selected *y* bus, $y_1$ may correspond to bus 44 of FIG. 2 and similar circuits may be provided for other bus lines. Ordinarily, only one pair of read and one pair of write sources are required for the entire memory plane. These are connected through switches (not shown) to the buses.

A sense line 72 may be used in common for all memory elements of the matrix. It is connected to a common gate circuit 74 which is like the one described in FIG. 2. The output of the gate circuit can be applied to a detector and amplifier.

Although the memory plane illustrated is shown formed of conventional circuit elements, in practice these are preferably formed for printed circuits. Also, for the sake of compactness, strip transmission line or similar techniques may be employed.

The memory plane illustrated is a random access memory and it has the same number of diodes along the *x* axis as along the *y* axis. It is to be understood that the invention is not meant to be limited to this specific configuration. For example, the matrix may be operated in many different modes such as word organized, *x-y* coincidence etc. Also there may be more elements along one dimension than along the other and the configuration can be square, rectangular, or any other shape desired. It is also to be understood that, if desired, a *z* axis may be employed for each diode. The *z* axis lines might supply an inhibit pulse to maintain particular diodes in a desired state during the application to these diodes of write pulses which would otherwise switch them to the opposite state.

It is preferred to interrogate the present memory circuit by applying reverse-bias read pulses and then sensing the presence or absence of the voltage tail due to the diode transition from the high to the low state. If the diode is interrogated by applying forward-bias pulses and sensing the diode transition from the low to the high state, the tail is found to be extremely short. The reason, it is believed, is that the load for the diode discharge after the read pulse has ended, is a relatively low value of resistance—substantially less than 20 ohms. Accordingly, the RC discharge time constant is small and the diode discharge is very rapid.

In a practical circuit according to FIG. 2, some typical value of circuit elements are as follows.

Resistors 32, 40, 42, and 54—50 ohms each

The write and read pulses may be of the order of one millimicrosecond, for example.

What is claimed is:

1. In combination, an active element having two regions in its operating range which exhibit a positive resistance and a region between them which exhibits a negative resistance, said two positive resistance regions defining two stable states of said element; means for applying to said element direct-current read pulses having an amplitude sufficient to switch the element from one stable state to the other; and means for sensing the presence or absence of a direct voltage of relatively large amplitude across said element during the periods immediately after the termination of said read pulses.

2. In combination, a negative resistance diode which is capable of assuming one of two stable voltage states; means for applying to said diode a reverse-bias read current having an amplitude sufficient to switch said diode into its low voltage state from its high voltage state during one interval of time; and circuit means connected to said diode for sensing the presence or absence of a direct voltage at a level substantially higher than that of said low voltage state across said diode during the period immediately after said one interval of time.

3. In combination, a negative resistance diode which is capable of assuming one of two stable states, one at a lower and the other at a higher voltage level; means for applying coincident reverse-bias, direct-current read pulses to the diode having an amplitude sufficient to switch the diode from its high to its low voltage state; and means coupled to said diode for sensing the presence or absence of a direct voltage of a value substantially higher than that of the low voltage state of the diode across said diode during the period immediately after the termination of said read pulse.

4. In combination, a negative resistance diode which is capable of assuming one of two stable states, one at a lower and the other at a higher voltage level; means for applying two reverse-bias, direct-current read pulses to the diode having an amplitude together which is sufficient to switch the diode from its high to its low voltage state; and means including a normally closed gate circuit for sensing the presence or absence of a direct voltage of a value substantially higher than that of the low voltage state of the diode across said diode during the period immediately after the termination of said read pulse.

5. In combination, a tunnel diode which is capable of assuming one of two stable states, one at a lower and the other at a higher voltage level; means for applying two reverse-bias, direct-current read pulses to the diode having an amplitude together which is sufficient to switch the diode from its high to its low voltage state; a normally closed gate circuit connected to said diode; and means for opening said gate circuit during a short period immediately after the termination of said read pulse.

6. A memory plane comprising, in combination, a plurality of $x$ leads; a plurality of $y$ leads; a plurality of negative resistance diodes each connected to one $x$ lead and one $y$ lead and each of said diodes being connected to a different pair of said leads; means for coincidentally applying a reverse-bias pulse to an $x$ lead and a reverse bias pulse to a $y$ lead, said pulses together having an amplitude sufficient to switch a diode at the intersection of said $x$ and $y$ leads from its high to its low voltage state; and means coupled to said diodes for sensing the presence or absence of a direct voltage of a value substantially higher than that from the low voltage state of the diode across said diode during the period immediately after the termination of said coincidental pulses.

References Cited in the file of this patent

UNITED STATES PATENTS

| | | |
|---|---|---|
| 2,889,538 | Geisler | June 2, 1959 |
| 2,907,000 | Lawrence | Sept. 29, 1959 |

FOREIGN PATENTS

| | | |
|---|---|---|
| 159,041 | Australia | Sept. 27, 1954 |

OTHER REFERENCES

"Gas Diode Memories," Electronic Design, May 1955, pp. 50–51.